(12) United States Patent
Ortner et al.

(10) Patent No.: US 7,216,664 B2
(45) Date of Patent: May 15, 2007

(54) DEVICE FOR BLOCKING THE WATER OUTLET OF A LIGHT LIQUID SEPARATOR

(75) Inventors: Heinrich Ortner, Lienz (AT);
Tiburtius Holzer, Ainet (AT)

(73) Assignee: Heinrich Ortner, Lienz (AT)

( * ) Notice: Subject to any disclaimer, the term of this patent is extended or adjusted under 35 U.S.C. 154(b) by 0 days.

(21) Appl. No.: 11/324,567

(22) Filed: Jan. 3, 2006

(65) Prior Publication Data
US 2006/0107999 A1 May 25, 2006

Related U.S. Application Data

(63) Continuation of application No. PCT/AT2004/00205, filed on Jun. 14, 2004.

(30) Foreign Application Priority Data
Jul. 4, 2003 (AT) .................................. 1027/2003

(51) Int. Cl.
*B01D 17/02* (2006.01)

(52) U.S. Cl. ........................ 137/172; 137/291; 137/409

(58) Field of Classification Search ................. 137/172, 137/272, 291, 409
See application file for complete search history.

(56) References Cited

U.S. PATENT DOCUMENTS 5,174,499 A * 12/1992 Al-Hamlan .................. 239/65

FOREIGN PATENT DOCUMENTS

| AT | 407 538 B | 4/2001 |
|---|---|---|
| DE | 299 11 0883 U 1 | 9/1999 |
| DE | 29911083 U1 * | 9/1999 |
| GB | 450 322 A | 7/1936 |

* cited by examiner

*Primary Examiner*—Kevin Lee
(74) *Attorney, Agent, or Firm*—Thomas M. Saunders; Brown Rudnick Berlack Israels

(57) ABSTRACT

The aim of the invention is to block the water outflow from a light liquid separator comprising an outflow ascending pipe (1) with a lower inlet (3), and a horizontal output pipe (2). To this end, a blocking element (4) displaced by a float (9) is provided. The float (9) and the blocking element (4) are displaceably guided on a fixing element (11) that can be detachably associated with the water outlet (1).

4 Claims, 2 Drawing Sheets

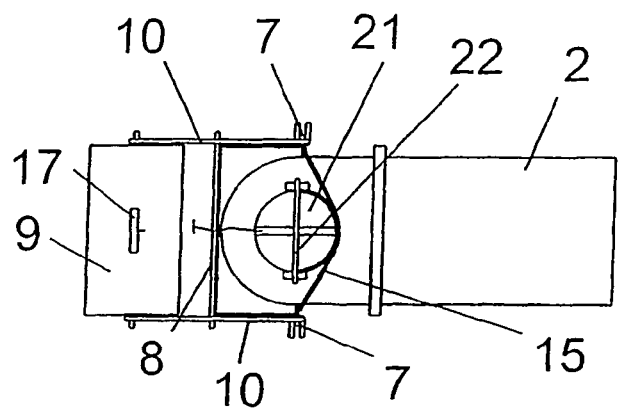
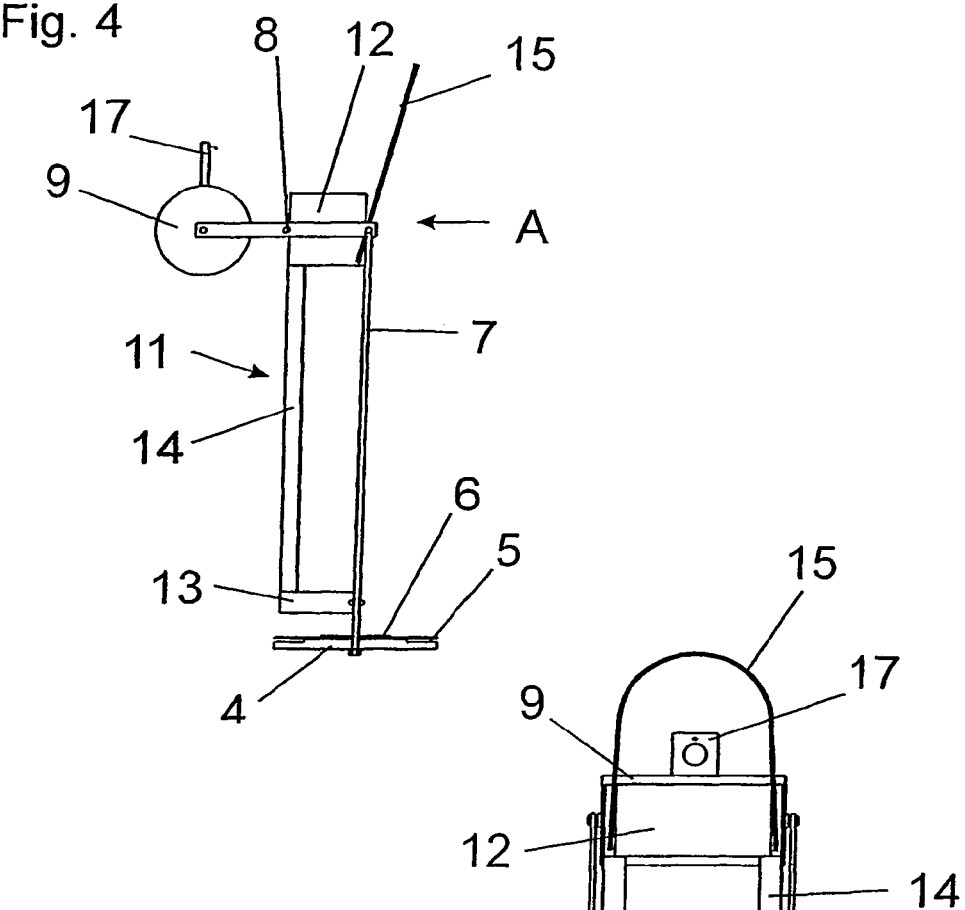
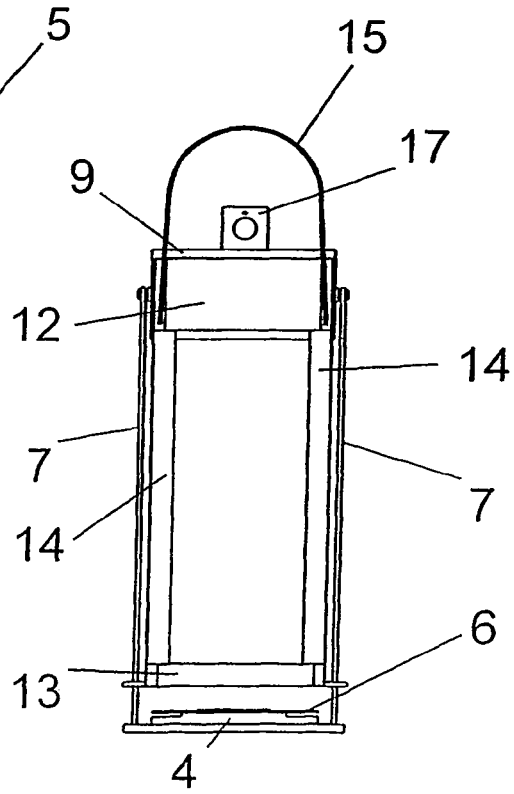

DEVICE FOR BLOCKING THE WATER OUTLET OF A LIGHT LIQUID SEPARATOR

RELATED APPLICATION INFORMATION

This application is a continuation of PCT/AT2004/000205, filed Jun. 14, 2004 which claims priority from Austrian Patent Application No. A1027/2003 filed Jul. 4, 2003 which is incorporated herein by reference.

FIELD OF THE INVENTION

The invention concerns an apparatus for blocking the water outlet from a light liquid separator which has a water inlet opening at the lower end of an outlet riser pipe and an upper water outlet opening, with a float and a blocking element which is movably coupled to the float and which closes the water inlet opening from below when the light liquid layer has to be removed. The invention further concerns a light liquid separator having such a blocking means.

BACKGROUND OF THE INVENTION

An apparatus of that kind is to be found for example in AT 407 538. That apparatus not only includes the float, the blocking element and a coupling linkage by way of which the float movement is converted into the closing movement of the blocking element, but also the outlet riser pipe with a horizontal discharge pipe. Fixed to the lower end of the outlet riser pipe are plates on which connecting bars are displaceably guided. Fixed in the upper region of the outlet riser pipe is an outer holding portion on which double-armed levers are mounted, the levers coupling the float to the connecting bars in such a way that the downwardly sinking float lifts the blocking element.

The apparatus is fitted as a complete unit into a separation vessel and includes an installation housing with an outlet riser pipe and the discharge pipe, and with at least one filter wall and a mounting plate which can be fixed in the separation vessel. In the event of troubles, either they have to be rectified in the installed condition in the separation vessel or the entire installation housing has to be removed. Both options are unsatisfactory and therefore the object of the invention is to improve the construction in such a way that it can be easily and simply fitted and broken down into its functional parts.

SUMMARY OF THE INVENTION

According to the invention therefore the apparatus for blocking the water outlet has a holding means which can be associated with the water outlet and on which the float and the blocking element are arranged. The holding means itself therefore, in contrast to the state of the art, can be fitted to the water outlet and if required can be removed from the water outlet again. Thus for example a damaged seal on the blocking element can be replaced without difficulty after the apparatus according to the invention has been gripped at the holding means and has been lifted without a tool out of the separation vessel or the installation housing.

For the holding means to be in the correct position it is possible to provide for example at the outside of an outlet riser pipe or discharge pipe supports on which corresponding regions of the holding means can be supported.

An advantageous combination of two preferred embodiments provides that the holding means is of a substantially U-shaped configuration and can be fitted from the side to the outlet riser pipe and has a loop which can be suspended on the horizontal discharge pipe of the water outlet. The holding means carrying the float and the blocking element can thus be suspended with the loop from the horizontal discharge pipe of the water outlet, wherein the U-shaped holding means loosely embraces the outlet riser pipe and the loop projects upwardly out of the light liquid. No fixing is required if the loop is arranged at the open side of the U-shape of the holding means so that the holding means is pressed against the outlet riser pipe by virtue of the rotational movement caused by the eccentric suspension configuration. The loop also cannot slip laterally if a holding or retaining element sticks up at the top side of the discharge pipe. If the discharge pipe has an upper checking or cleaning opening which is closed by a cover the loop can be hung in position beyond the cover.

In a preferred embodiment the holding means can have an upper and a lower U-shaped plate which are connected by vertical bars. That provides a structure of very low weight. As an aid for handling, it is further possible to provide on the float a handle which, even at maximum thickness of the light liquid layer, projects upwardly out of same.

Preferably, in the apparatus according to the invention the float is arranged at two mutually parallel, double-armed levers which are mounted rotatably to the holding means and to the second ends of which are pivoted substantially vertically downwardly extending connecting bars on which the blocking element is arranged.

When the blocking element has closed the outlet pipe by virtue of the predetermined height of the layer of light liquid, the light liquid is removed. By virtue of the differing hydrostatic pressure on both sides of the blocking element it does not then open automatically but has to be opened by external influences. A preferred configuration provides a closure position release device which has a release element which can be engaged on the handle of the float and which is accessible from above for example by way of the opening in the separation vessel. When the release element is pulled up the float pivots upwardly on the two lever arms, with the connecting bars urging the blocking element downwardly. If an upper opening for inspection and cleaning purposes is provided in a prolongation of the vertical outlet riser pipe, it is alternately also possible to consider opening the blocking element by a push rod or the like which is introduced through the outlet riser pipe. In particular in that case it is also possible for the float and the blocking element to be connected together by way of a cable or the like which experiences a change in direction.

The invention will now be described in greater detail with reference to the Figures of the accompanying drawings without being restricted thereto.

BRIEF DESCRIPTION OF THE DRAWINGS

FIG. 2 and FIG. 3 show a side view and a plan view of a blocked water outlet, wherein parts of the installation housing of the light liquid separator are omitted, FIG. 4 shows a side view of an apparatus according to the invention, and FIG. 5 shows a view in the direction of the arrow A in FIG. 4.

DETAILED DESCRIPTION OF THE INVENTION

Figure 2:
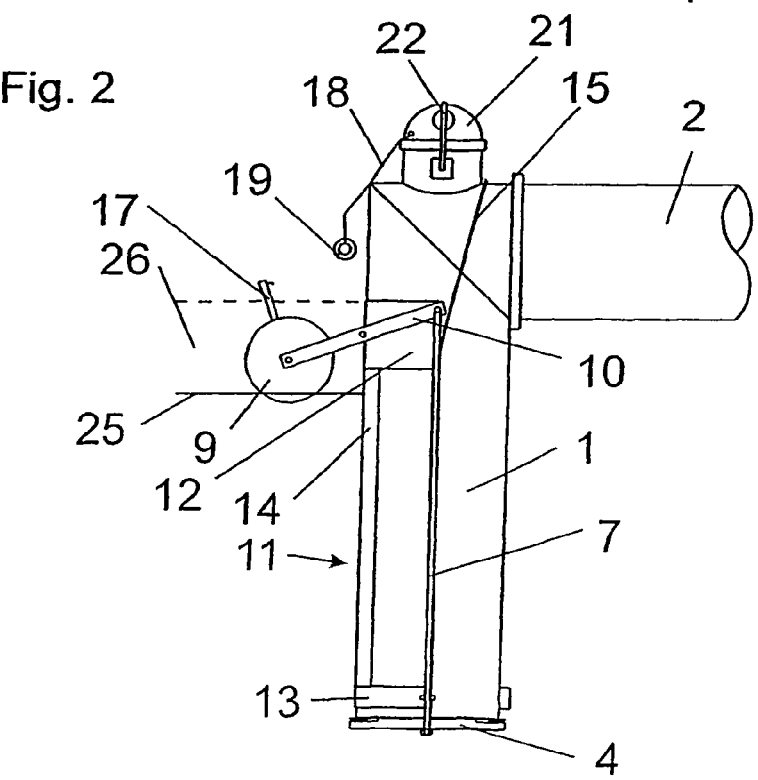

In order to remove light liquids such as oil or the like from sewage, a light liquid separator is provided in a separation vessel in which preferably also solids are deposited. The water outlet includes a vertical outlet riser pipe 1 and a subsequent, substantially horizontal discharge pipe 2 which predetermines the maximum height of the water surface 25. The water outlet must be blocked if, as can be seen from FIG. 2, the thickness of the layer 26 of light liquid reaches an extent which has lowered the water surface 25 to a minimum height, below which functioning of the light liquid separation is in doubt, and at which therefore at the latest the light liquid must be removed.

The inlet opening 3 of the outlet riser pipe 1 is below the minimum water surface 25 so that in any event only water can flow into the outlet riser pipe 1. Associated with the inlet opening 3 is a blocking element 4 which is provided with a seal 6 and which closes it when the water surface 25 falls to the minimum height. A float 9, the blocking element 4 and a movement-transmitting linkage are provided on a holding means 11 and form a unit which can be loosely inserted and easily removed. The holding means has an upper, approximately U-shaped plate 12 and a lower, approximately U-shaped plate 13 which are pushed from the side on to the outlet riser pipe 1 and are connected by vertical bars 14. Provided on the upper plate 12 is a loop 15 which, when the apparatus is fitted, is hung over the horizontal discharge pipe 2. The lower plate 13 has guides for two vertically movable connecting bars 7 which are guided upwardly and are pivoted to the ends of two lever arms 10. The two mutually parallel lever arms 10 are mounted pivotably about axes 8 which are arranged at the upper plate 12 of the holding means 11 and at the other ends carry the float 9. By virtue of that arrangement, the blocking element 4 is raised and closes the inlet opening 3 when the float 9 moves downwardly out of the normal position shown in FIG. 1 into the minimum position of FIG. 2. The blocking element 4 is in the form of a plate with an annularly stepped edge region 5, wherein the disc-shaped seal also covers over the edge region 5. The stepping of the edge region 5 improves the sealing effect upon first contact of the rising blocking element 4 in order quickly to produce a hydrostatic pressure difference between the interior of the outlet riser pipe 1 and the separation vessel.

Provided in a prolongation of the outlet riser pipe 1 is an upper opening which is closed by a cover 21 provided with a locking means 22. Upon assembly of the unit the loop 15 is passed over the cover 21 and laid on the discharge pipe 2 where it is secured by the cover 21, without its own fixing. In order to hold the blocking element 4 in the open condition after assembly of the apparatus, a cable or the like is provided with an eye 19 which is engaged into the handle 17 of the float 9. As soon as the float 9 has floated up upon first filling of the separation vessel, the eye 19 is unhooked from the handle 17 and the apparatus is released.

When the outlet pipe 1 is closed by the blocking element 4, the layer 26 of light liquid must be removed before further water can flow into the separation vessel. In that situation some water flows back out of the outlet riser pipe 1 so that, after refilling, by virtue of the hydrostatic pressure difference, the blocking element 4 cannot open of its own accord but must be deliberately opened. That moreover also ensures removal of the light liquid. The apparatus is therefore provided with a closure position release device having a release element 23 which is only diagrammatically indicated and which can be engaged into the handle 17 of the float and which is accessible through an upper opening in the separation vessel. The blocking element 4 could also be urged downwardly after opening of the cover 21 by a bar or the like so that neither the assembly locking arrangement 18, 19 nor the closure position release device are absolutely necessary.

Figure 1:
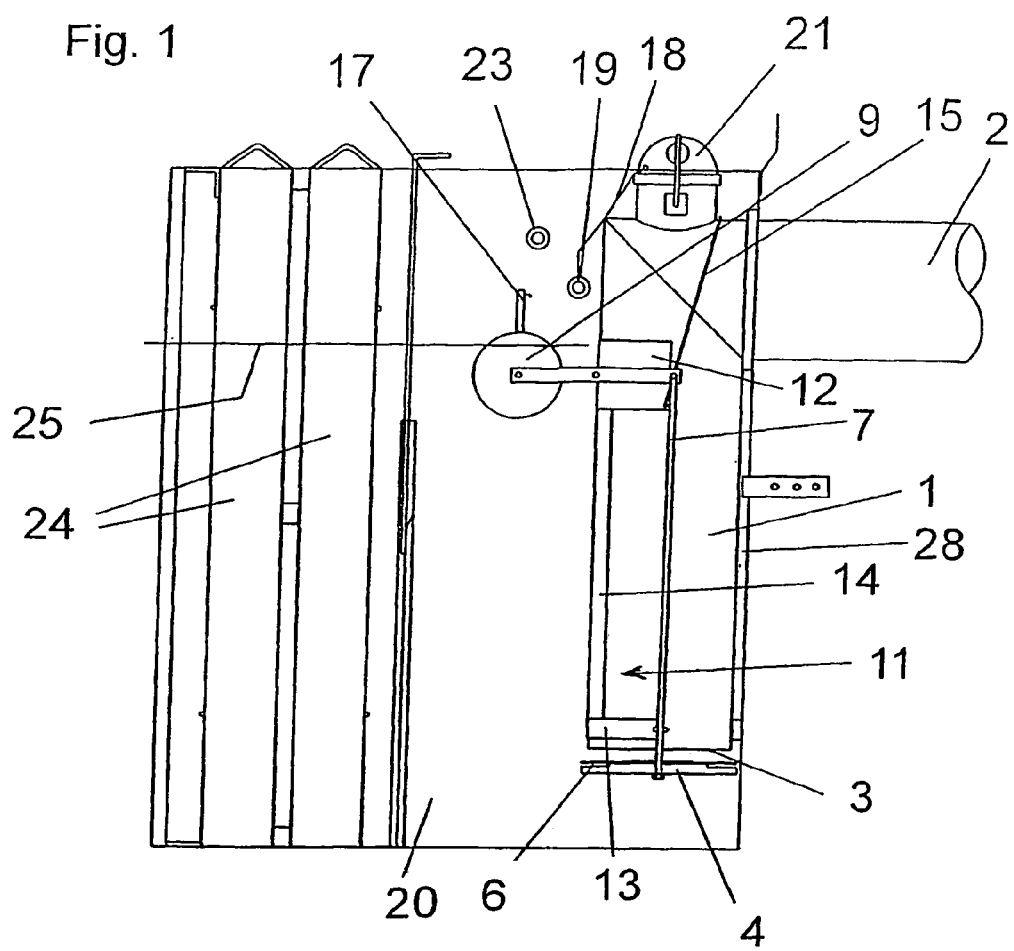
FIG. 1 shows a side view of a water outlet which can be blocked by means of an apparatus according to the invention in the opened condition.

FIG. 1 diagrammatically shows an installation housing 20 in which the two pipes 1, 2 of the water outlet are arranged and which is provided with an assembly plate 28 or the like which can be fixed to the wall of the separation vessel. At least one side wall of the installation housing 20 must be water-permeable and is for example in the form of a retractable coalescence filter 24. The apparatus for blocking the water inlet opening 3 is suspended from the discharge pipe 2 in the manner described.

We claim:

1. Apparatus for blocking the water outlet from a light liquid separator which has a water inlet opening at the lower end of an outlet riser pipe and an upper water outlet opening, at a substantially horizontal discharge pipe, said apparatus comprising a holding means having a substantially U-shaped configuration having vertical sides to be fitted from the side to the outlet riser pipe, said holding means carrying a float and a blocking element movably coupled to the float, said blocking element closing the water inlet opening from below when the light liquid layer has to be removed from the water surface and wherein said holding means further has an upper and a lower substantially U-shaped plate which are connected by vertical bars, wherein provided on the upper plate is a mounting means for the float and provided on the lower plate is a guide for said blocking element.

2. Apparatus according to claim 1 characterised in that the holding means has a loop which can be suspended from the discharge pipe.

3. Apparatus according to claim 1 characterised in that the float has an upwardly projecting handle.

4. A light liquid separator comprising a water outlet which has an outlet riser pipe having a lower water inlet opening and a horizontal discharge pipe on which there is provided an upper opening which is aligned with the outlet riser pipe and which is closable with a cover, and comprising an apparatus according to claim 1 for blocking the water outlet, the apparatus having a float and a blocking element which is movably coupled to the float and which closes the water inlet opening from below when the light liquid layer has to be removed from the water surface, characterised in that a holding means releasably associated with the water outlet is of a substantially U-shaped configuration and is laterally fitted to the outlet riser pipe and has a loop which is suspended from the discharge pipe beyond the cover and wherein said holding means further has an upper and a lower substantially U-shaped plate which are connected by vertical bars, wherein provided on the upper plate is a mounting means for the float and provided on the lower plate is a guide for said blocking element.

* * * * *